(12) United States Patent
Kuck et al.

(10) Patent No.: US 7,788,300 B2
(45) Date of Patent: Aug. 31, 2010

(54) GARBAGE COLLECTION FOR SHARED DATA ENTITIES

(75) Inventors: Norbert Kuck, Karlsruhe (DE); Oliver Schmidt, Worth am Rhein (DE); Arno Hilgenberg, Mannheim (DE); Ralf Schmelter, Wiesloch (DE)

(73) Assignee: SAP AG, Walldorf (DE)

( * ) Notice: Subject to any disclaimer, the term of this patent is extended or adjusted under 35 U.S.C. 154(b) by 676 days.

(21) Appl. No.: 10/942,736

(22) Filed: Sep. 15, 2004

(65) Prior Publication Data

US 2006/0059453 A1    Mar. 16, 2006

(51) Int. Cl.
    *G06F 17/00*   (2006.01)
(52) U.S. Cl. .............................. 707/813; 707/814
(58) Field of Classification Search .............. 707/206
    See application file for complete search history.

(56) References Cited

U.S. PATENT DOCUMENTS

| | | | | |
|---|---|---|---|---|
| 4,814,971 A | * | 3/1989 | Thatte | 714/15 |
| 5,828,821 A | * | 10/1998 | Hoshina et al. | 711/147 |
| 5,873,105 A | * | 2/1999 | Tremblay et al. | 707/206 |
| 5,892,944 A | * | 4/1999 | Fukumoto et al. | 718/100 |
| 5,960,087 A | * | 9/1999 | Tribble et al. | 713/167 |
| 5,974,536 A | * | 10/1999 | Richardson | 711/159 |
| 6,011,537 A | * | 1/2000 | Slotznick | 707/E17.119 |
| 6,671,707 B1 | * | 12/2003 | Hudson et al. | 707/206 |
| 6,938,131 B2 | * | 8/2005 | Ogasawara | 711/151 |
| 6,993,770 B1 | * | 1/2006 | Detlefs et al. | 719/315 |
| 7,171,425 B2 | * | 1/2007 | Cazemier | 707/103 R |
| 7,174,437 B2 | * | 2/2007 | Kaczynski | 711/158 |
| 2002/0099765 A1 | * | 7/2002 | Otis | 709/203 |
| 2002/0120428 A1 | * | 8/2002 | Christiaens | 702/186 |
| 2003/0182347 A1 | * | 9/2003 | Dehlinger | 709/1 |
| 2004/0148475 A1 | * | 7/2004 | Ogasawara | 711/151 |
| 2005/0025555 A1 | * | 2/2005 | Wessells et al. | 400/624 |
| 2005/0091670 A1 | * | 4/2005 | Karatal et al. | 719/328 |
| 2005/0102670 A1 | * | 5/2005 | Bretl et al. | 718/1 |
| 2005/0198088 A1 | * | 9/2005 | Subramoney et al. | 707/206 |
| 2005/0262181 A1 | * | 11/2005 | Schmidt et al. | 709/200 |

(Continued)

OTHER PUBLICATIONS

Jones et al., "Garbage Collection: Algorithms for Automatic Dynamic Memory Management", Dec. 31, 1996, John Wiley & Sons, p. 300-310.*

(Continued)

*Primary Examiner*—Khanh B Pham
(74) *Attorney, Agent, or Firm*—Blakely, Sokoloff, Taylor & Zafman LLP

(57) ABSTRACT

Methods and apparatus, including computer systems and program products, for garbage collection of shared data entities. A computer program identifies a set of virtual machines (VMs), each operable to generate references to shared entities stored in shared memory. Each shared entity can include references to one or more of the other shared entities. The program waits for the VMs to independently identify the shared entities that they reference directly, and then initiates a shared garbage collection procedure to identify the shared entities that are not directly or indirectly referenced by any of the VMs and to reclaim the shared memory being used to store those shared entities. The VMs are prevented from generating new references to the shared entities solely during a portion of the shared garbage collection procedure. By minimizing the time during which access to the shared entities is restricted, performance and scalability can be increased.

15 Claims, 7 Drawing Sheets

U.S. PATENT DOCUMENTS

2005/0262493 A1* 11/2005 Schmidt et al. ............. 717/164
2005/0262512 A1* 11/2005 Schmidt et al. ............. 719/310
2006/0070051 A1* 3/2006 Kuck et al. ................. 717/162

OTHER PUBLICATIONS

Lindholm et al., "Java Virtual Machine Specification", Sep. 1996, Sun Microsystems, p. 1-10, 57-69, 86, 102-104.*

Bacon et al., "Java without the Coffee Breaks: A Noninstrusive Multiprocessor Garbage Collector",ACM SIGPLAN Notices, Proceedings of the ACM SIGPLAN 2001 Conference on Programming Language Design and Implementation PLDI, '01, vol. 36, Issue 5, p. 92-103.*

Flood et al., "Parallel Garbage Collection for Shared Memory Management", USENIX JVM Conference, Apr. 2001, <http://citeseer.ist.psu.edu/flood01parallel.html>.*

Ciardo et al, "Saturation: An Efficient Iteration Strategy for Symbolic State-space Generation", ICASE Technical Report No. 2001-5, NASA, p. 1-16. <Retrieved from internet Dec. 10, 2008>.*

Johnstone et al, "Non-Compacting Memory Allocation and Real-time Garbage Collection", Jan. 1996, Dissertation Proposal, Univ. of Texas, Austin, p. 1-48. <Retrieved from internet Dec. 10, 2008>.*

Prakash et al, "Non-Blocking Algorithms for Concurrent Data Structures", Jul. 1, 1991, Univ. of Florida, 20 pages, <Retrieved from File U.S. Appl. No. 09/837,671 on May 16, 2009>.*

Detlefs, "Garbage Collection and Run-time typing as a C++ Library", Jun. 1992, Digital Equipment Corp, System Research Center, Palo Alto, CA, 20 pages, <Retrieved from File U.S. Appl. No. 09/837,671 on May 16, 2009>.*

* cited by examiner

STARTING PHASE

CONTRIBUTING PHASE

CONTRIBUTING PHASE (CONTINUED)

CONTRIBUTING PHASE (CONTINUED)

RECLAIMING PHASE

GARBAGE COLLECTION FOR SHARED DATA ENTITIES

BACKGROUND

The present application relates to digital data processing, and more particularly to garbage collection for shared data entities.

FIG. 1 illustrates a client/server system 50 in which a network 75 links a server 80 to client systems 62, 64, 66. The server 80 is a programmable data processing system suitable for implementing apparatus, programs, or methods in accordance with the invention. The server 80 provides a core operating environment for one or more runtime systems that process user requests. The server 80 includes a processor 85 and a memory 90. The memory 90 can be used to store an operating system, a Transmission Control Protocol/Internet Protocol (TCP/IP) stack for communicating over the network 75, and machine-executable instructions executed by the processor 85. In some implementations, the server 80 can include multiple processors, each of which can be used to execute machine-executable instructions. The memory 90 can include a shared memory area 92 (shown in subsequent figures) that is accessible by multiple operating system processes executing in the server 90. An example of a suitable server that can be used in the client/server system 50 is a Java 2 Platform, Enterprise Edition (J2EE) compatible server, such as the Web Application Server developed by SAP AG of Walldorf (Baden), Germany (SAP), or the WebSphere Application Server developed by IBM Corp. of Armonk, N.Y.

Client systems 62, 64, 66 can execute multiple applications or application interfaces. Each instance of an application or an application interface can constitute a user session. Each user session can generate one or more requests to be processed by the server 80. The requests can include instructions or code to be executed on a runtime system (e.g., the virtual machine 100) on the server 80.

A runtime system is a code execution environment that executes instructions or code in user requests and that provides runtime services for that code. Core runtime services can include functionality such as process, thread, and memory management (e.g., laying out objects in the server memory 90, sharing objects, managing references to objects, and garbage collecting objects). Enhanced runtime services can include functionality such as error handling and establishing security and connectivity.

One example of a runtime system is a virtual machine. A virtual machine (VM) is an abstract machine that can include an instruction set, a set of registers, a stack, a heap, and a method area, like a real machine or processor. A VM essentially acts as an interface between program code and the actual processor or hardware platform on which the program code is to be executed. The program code includes instructions from the VM instruction set that manipulates the resources of the VM. The VM executes instructions on the processor or hardware platform on which the VM is running, and manipulates the resources of that processor or hardware platform, so as to effect the instructions of the program code. In this way, the same program code can be executed on multiple processors or hardware platforms without having to be rewritten or re-compiled for each processor or hardware platform. Instead, a VM is implemented for each processor or hardware platform, and the same program code can be executed in each VM. The implementation of a VM can be in code that is recognized by the processor or hardware platform. Alternatively, the implementation of a VM can be in code that is built directly into a processor.

As an example, a Java source program can be compiled into program code known as bytecode. Bytecode can be executed on a Java VM running on any processor or platform. The Java VM can either interpret the bytecode one instruction at a time, or the bytecode can be further compiled for the real processor or platform using a just-in-time (JIT) compiler.

In addition to Java VMs, other examples of VMs include Advanced Business Application Programming language (ABAP) VMs and Common Language Runtime (CLR) VMs. ABAP is a programming language for developing applications for the SAP R/3 system, a widely installed business application system developed by SAP. The Common Language Runtime is a managed code execution environment developed by Microsoft Corp. of Redmond, Wash. For purposes of simplicity, the discussion in this specification focuses on virtual machines, but it is to be understood that the techniques described herein can also be used with other types of runtime systems.

When executing, runtime systems create and reference local data entities. Many different types of local entities can be created, including, for example, strings, constants, and variables, objects that are instances of a class, runtime representations of a class, and class loaders that are used to load class runtime representations.

When a local entity is no longer being used by a runtime system, the memory being used to store the local entity needs to be reclaimed—i.e., freed or otherwise released and returned to the pool of available memory—so that it can be used to store new data entities. In some environments, programmers must explicitly reclaim the memory they have allocated for local entities (e.g., by explicitly calling functions to free specified sections of memory). In other environments, the reclamation of memory is handled through a technique known as garbage collection.

Garbage collection is a process designed to identify and reclaim blocks of memory that have been dispensed by a memory allocator but that are no longer "live" (i.e., no longer being used, as determined, for example, by not being reachable from any currently referenced objects or entities). Garbage collection can sometimes be handled as a background task by runtime systems rather than as an explicit task by user programs. Garbage collection can also be handled as an inlined task.

Systems that reclaim memory through garbage collection provide several advantages over systems that leave reclamation up to users—in particular, systems that use garbage collection tend to be more reliable, as they help to eliminate common programming problems such as dangling pointers and memory leaks. There are some costs associated with garbage collection, however, as access to memory must typically be restricted and runtime systems must sometimes be halted, at least during some portion of the garbage collection process. Nevertheless, garbage collection is frequently used to reclaim memory in runtime systems, and there are many known garbage collection algorithms (e.g., reference counting, mark-sweep, mark-compact, and copying algorithms).

Multiple runtime systems can be executed in parallel in order to increase the performance and scalability of server environments. When multiple runtime systems are executed in parallel, resource (e.g., memory) and time consumption can be reduced by sharing entities between the runtime systems. There are multiple known techniques that can be used to share entities, and many different types of entities can be shared (including for example strings, constants, variables, object instances, class runtime representations, and class loaders).

The lifetime of shared entities may be different than the lifetime of local entities, and as such, it may not be possible to use standard garbage collection techniques to reclaim memory that is being used to store shared entities. For example, it may not be possible to use a local garbage collection process for garbage collection of shared entities. A local garbage collection process, which is normally used to reclaim local memory (e.g., memory being used to store local entities associated with one runtime system), is typically designed to garbage collect a data entity when that runtime system no longer references the data entity. However, a shared entity should not necessarily be garbage collected when one runtime system no longer references the shared entity, as other runtime systems may still be referencing the shared entity. Garbage collection of shared entities thus requires some coordination and cooperation between participating runtime systems.

SUMMARY

The present invention provides methods and apparatus, including computer program products, that implement techniques for garbage collecting shared data entities.

In one general aspect, the techniques feature a computer program with instructions that are operable to execute multiple runtime systems. Each runtime system is operable to execute user code corresponding to user requests independently of the other runtime systems, and, during execution of the user code, to generate references to one or more shared entities. Each shared entity is stored in a shared memory that is accessible by all the runtime systems, and each shared entity can include one or more additional references to one or more of the other shared entities.

The instructions are further operable to identify a root set of shared entities, which includes the shared entities that are directly referenced by at least one of the runtime systems. After the root set of shared entities has been identified, the instructions are operable to temporarily disable the generation of new references from the runtime systems to the shared entities.

The instructions are additionally operable to identify the shared entities that are not reachable from the root set of shared entities. A particular shared entity is not reachable from the root set of shared entities if there does not exist a sequence of references starting with a shared entity in the root set of shared entities and ending with the particular shared entity.

The instructions are further operable to free a portion of the shared memory, the portion of the shared memory being used to store the shared entities that are not reachable from the root set of shared entities, and, after freeing the portion of the shared memory, to enable the generation of new references from the runtime systems to the shared entities.

Advantageous implementations can include one or more of the following features. The runtime systems can include one or more of Java virtual machines, Advanced Business Application Programming language (ABAP) virtual machines, and Common Language Runtime (CLR) virtual machines. The shared entities can include one or more of object instances, class runtime representations, class loaders, and interned strings.

The computer program can further contain instructions operable to detect a predetermined event associated with the start of a shared garbage collection cycle, and the instructions that are operable to identify the root set of shared entities can be executed after the predetermined event has been detected. The predetermined event can include reaching a predetermined usage level of the shared memory.

The instructions that are operable to identify the root set of shared entities can include instructions that are operable to identify a subset of the runtime systems, wait for each runtime system in the subset of the runtime systems to identify the shared entities that are directly referenced by the runtime system, and add the shared entities that are directly referenced by each runtime system in the subset of the runtime systems to the root set of shared entities.

Each runtime system in the subset of the runtime systems can be operable to identify the shared entities that are directly referenced by the runtime system independently of the other runtime systems in the subset of the runtime systems. Each runtime system can also be operable to identify the shared entities that are directly referenced by the runtime system after the occurrence of a predetermined event associated with the runtime system.

Each runtime system can be further operable to generate references to one or more local entities associated with the runtime system, wherein each local entity is stored in a local memory that is associated with the runtime system. The predetermined event after whose occurrence can trigger each runtime system to identify the shared entities that are directly referenced by the runtime system can include the initiation of a local garbage collection cycle to reclaim a portion of the local memory of the runtime system. The predetermined event associated with each runtime system can also include the expiration of a predetermined period of time.

The instructions that are operable to identify the root set of shared entities can include instructions that are operable to detect generation of one or more new references from a new runtime system to one or more of the shared entities, the new runtime system not being included in the subset of the runtime systems, and add the shared entities that are directly referenced by the new runtime system to the root set of shared entities.

The instructions that are operable to identify the shared entities that are not reachable from the root set of shared entities can include instructions that are operable to traverse all the shared entities that are transitively referenced by at least one of the shared entities in the root set of shared entities, and to modify an attribute associated with each of the shared entities that is traversed.

The operation to temporarily disable the generation of new references from the runtime systems to the shared entities can occur after the operation to identify the shared entities that are not reachable from the root set of shared entities. In such an implementation, upon generating one or more new references to one or more of the shared entities (i.e., newly-referenced shared entities), the runtime systems can be operable to detect whether the operation to identify the shared entities that are not reachable from the root set of shared entities has begun, and if so, to participate in that operation by identifying the shared entities that are reachable from the newly-referenced shared entities.

In another aspect, the techniques feature a computer program product with instructions that are operable to identify a set of VMs. Each VM in the set of VMs is operable to generate references to one or more shared entities. The shared entities are stored in a shared memory that is accessible by each VM in the set of VMs, and each shared entity can include one or more additional references to one or more of the other shared entities.

The instructions are further operable to wait for each VM in the set of VMs to independently identify the shared entities that are directly referenced by the VM, and, after each VM in the set of VMs has independently identified the shared entities that are directly referenced by the VM, initiate a shared garbage collection procedure to identify the shared entities that are not directly or indirectly referenced by any of the VMs and to reclaim a portion of the shared memory being used to store the shared entities that are not directly or indirectly referenced by any of the VMs. The instructions are additionally operable to prevent the VMs from generating new references to the shared entities solely during a portion of the shared garbage collection procedure.

Advantageous implementations can include one or more of the following features. Each VM in the set of VMs can be further operable to generate references to one or more local entities associated with the VM, wherein the local entities are stored in a local memory associated with the VM, and wherein each local entity can include one or more additional references to the other local entities and to the shared entities. Each VM can also be operable to perform a local garbage collection procedure independently of the other VMs. Performing a local garbage collection procedure can include identifying the local entities that are not directly or indirectly referenced by the VM and reclaiming a portion of the local memory being used to store the local entities that are not directly or indirectly referenced by the VM. In addition, each VM can be operable to initiate the identification of the shared entities that are directly referenced by the VM after the initiation of the local garbage collection procedure by the VM.

The operation in the shared garbage collection procedure to identify the shared entities that are not directly or indirectly referenced by any of the VMs can include an operation to traverse the shared entities that are transitively referenced by the shared entities that are directly referenced by one or more of the VMs in the set of VMs.

The portion of the shared garbage collection procedure during which the VMs are prevented from generating new references to the shared entities can include the entire garbage collection procedure, or only a part of the shared garbage collection procedure, such as the operation to reclaim the portion of the shared memory being used store the shared entities that are not directly or indirectly referenced by any of the VMs. In the latter scenario, upon generating one or more new references to one or more of the shared entities (newly-referenced shared entities), each VM can be further operable to detect whether the shared garbage collection procedure has begun, and if so, to traverse the shared entities that are transitively referenced by the newly-referenced shared entities and identify the traversed shared entities as shared entities that are referenced by the VMs.

The techniques described in this specification can be implemented to realize one or more of the following advantages. The techniques can be used to effect a hierarchical garbage collection scheme, where each runtime system uses a local garbage collection process to reclaim memory used to store local data entities, and cooperates with other runtime systems to execute a shared garbage collection process to reclaim memory used to store shared data entities. Moreover, the techniques can be used to coordinate local garbage collection and shared garbage collection in a manner that allows some of the work done during local garbage collection to be used in shared garbage collection, thereby making the shared garbage collection process more efficient because such work does not need to be repeated. In addition, simply by virtue of implementing garbage collection for shared entities, the techniques enable the sharing of data entities in runtime systems (e.g., Java VMs) that rely on garbage collection for the reclamation of memory.

The shared garbage collection process can run concurrently with the runtime systems. The use of a concurrent shared garbage collection process allows the runtime systems to continue to operate independently and to access shared entities while they cooperate in assembling a root set of shared entities to be used by the shared garbage collection process. The independent operation of the runtime systems includes the independent execution of local garbage collection processes, as well as the continued ability to access shared entities and to generate new references to shared entities. In some implementations, the disclosed garbage collection techniques maximize the performance and scalability of an overall system by minimizing the time during which the runtime systems are prevented from generating references to shared entities.

These general and specific aspects can be implemented using a computer program, a method, a system or apparatus, or any combination of computer programs, methods, or systems. The details of one or more embodiments of the invention are set forth in the accompanying drawings and in the description below. Other features, objects, and advantages of the invention will be apparent from the description, the drawings, and the claims.

BRIEF DESCRIPTION OF THE DRAWINGS

Like reference numbers and designations in the various drawings indicate like elements.

DETAILED DESCRIPTION

As described above, runtime systems can share data entities in order to reduce resource and time consumption (e.g., the time required to build and initialize multiple copies of an object, and the memory required to store those copies). Entities can be shared through various known techniques. For example, entities can be shared by storing them in a shared memory area or heap that is accessible by multiple runtime systems.

In general, entities that are shared through a shared memory heap should not have any pointers or references into any private heap (e.g., the local memories of individual VMs). If an entity in the shared memory heap has a member variable with a reference to a private entity in one particular VM, that reference would be invalid for other VMs that use that shared entity. More formally, this restriction can be thought of as follows: For every shared entity, the transitive closure of the entities referenced by the initial entity should only contain shared entities at all times.

Accordingly, in one implementation, entities are not put into the shared memory heap by themselves—rather, entities are put into the shared memory heap in groups known as "shared closures." A shared closure is an initial entity plus the transitive closure of all the entities referenced by the initial entity.

Figure 1:
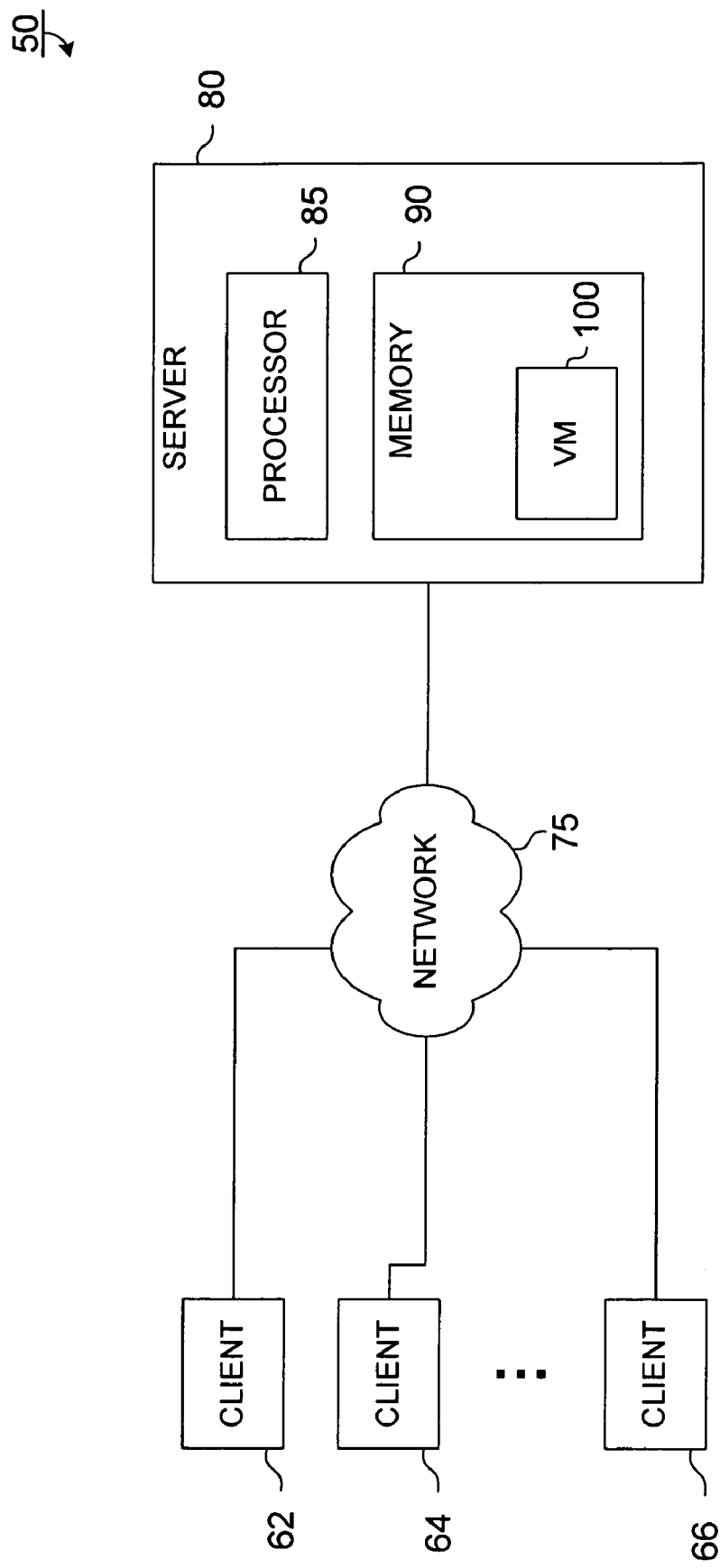
FIG. 1 is a block diagram of a client/server system.
Figure 2A:
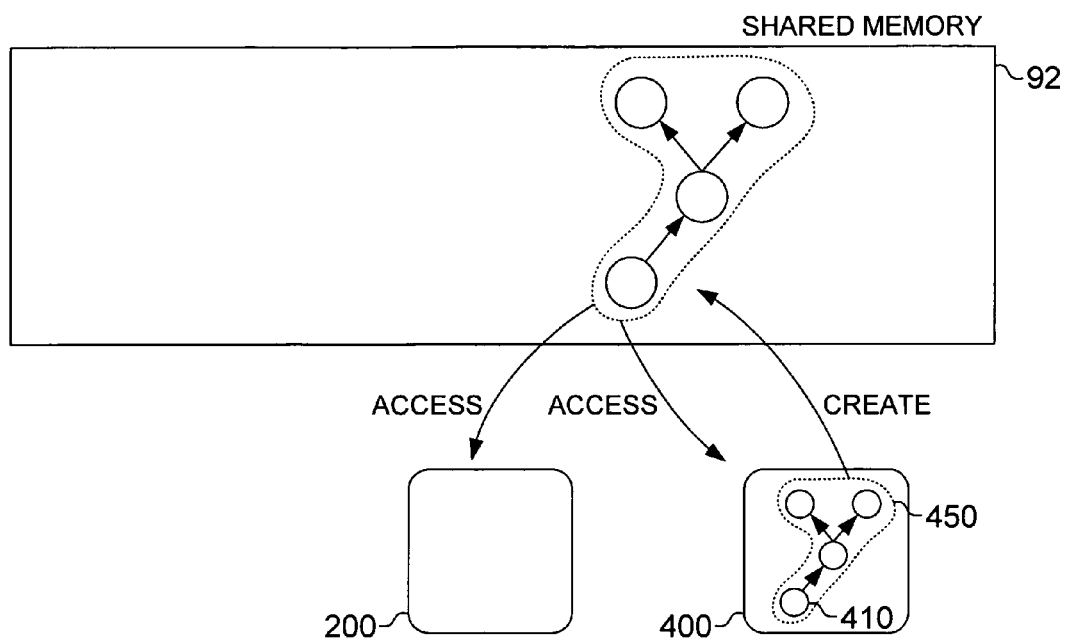
FIGS. 2A and 2B illustrate the sharing of entities between VMs in the client/server system of FIG. 1.

The sharing of entities through shared closures is shown conceptually in FIG. 2A, where a shared closure 450 has been identified in the local memory of a first VM 400 by grouping a first data entity 410 with the transitive closure of all the entities referenced by the first entity 410. After the shared closure 450 has been identified, the VM 400 can create the shared closure in a shared memory area 92, e.g., by copying the shared closure 450 into the shared memory area 92. After the shared closure 450 has been created in the shared memory area 92, it can be accessed by the VMs in the server (e.g., VMs 200 and 400). A VM can access the shared closure 450 from the shared memory area 92 by, for example, mapping or copying the shared closure 450 from the shared memory area 92 into the address space of a process in which the VM is executing.

In order to qualify for use within a shared closure, an entity must be "shareable." In general, a complex data structure (e.g., a heap or a portion thereof) in one runtime system (e.g., a Java VM) can be shared with a second runtime system if the data structure can be disassembled and then reassembled in the native format of the second runtime system without breaking the internal consistency or functionality of the data structure.

In one implementation, entities are shared through the copying of shared closures to and from shared memory. For an entity to be shareable in such an implementation, the entity must be able to withstand a transparent deep-copy into the address space of another VM without breaking the internal consistency or functionality of the entity. The shareability conditions for such an implementation generally require the class of which the entity is an instance not to execute any custom code in serializing or deserializing an instance of the class. Additional details about techniques for sharing data entities (including shareability requirements and the creation and use of shared closures) can be found in U.S. patent application Ser. No. 10/851,795, entitled "Sharing Objects in Runtime Systems," filed on May 20, 2004. Other sharing techniques are also known in the art and can be used to share data entities.

Figure 2B:
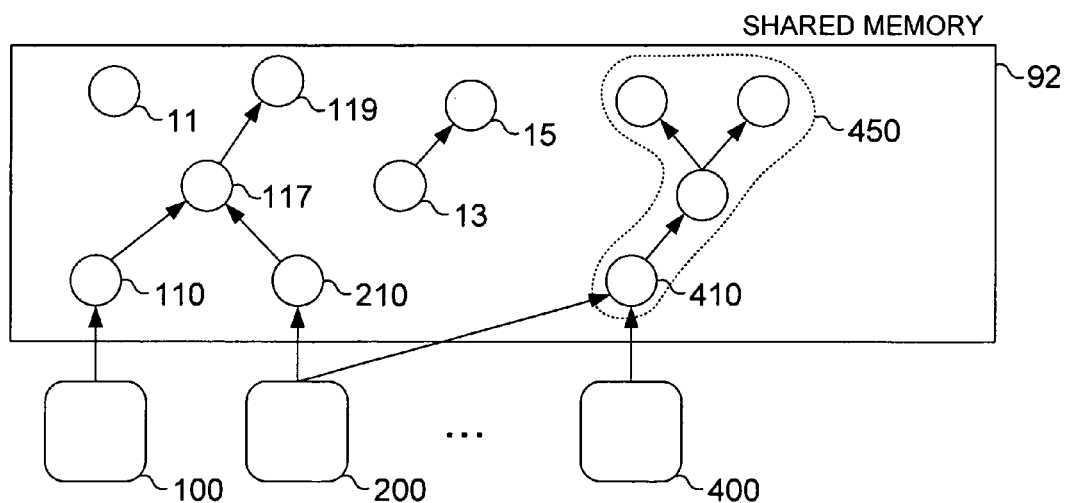

FIG. 2B illustrates a snapshot of a shared memory area 92, which includes multiple entities being shared by a set of VMs (e.g., the VMs 100, 200, and 400). The shared entities include several entities that are directly referenced by the VMs (e.g., the shared entities 110, 210, and 410). The entities that are directly referenced by one or more of the VMs can be thought of as forming a "root set" of shared entities.

The shared entities that are directly referenced by the VMs may themselves reference other shared entities (e.g., the shared entities 117 and 119). The latter shared entities can be thought of as being indirectly referenced by the VMs, since there are one or more predecessor entities in the chain of references from the VMs to those entities.

Finally, the shared entities in the shared memory area 92 also include a number entities that are not currently referenced, either directly or indirectly, by any VM (e.g., the entities 11, 13, and 15). It is these entities, which are not reachable by any sequence of references from the root set of shared entities, which can be deemed no longer used and which can thus be garbage collected.

A mark-sweep garbage collection algorithm can be used to identify the shared entities that are no longer being used and to reclaim the memory associated with those entities. Given a root set of shared entities that are directly referenced by the VMs, a mark-sweep garbage collection algorithm transitively traverses and marks the entities that are referenced by the entities in the root set. When the marking phase is complete, the garbage collection algorithm then sweeps or reclaims the memory of any entities that are not marked, since such entities are not reachable from any currently referenced entities.

Figure 3:
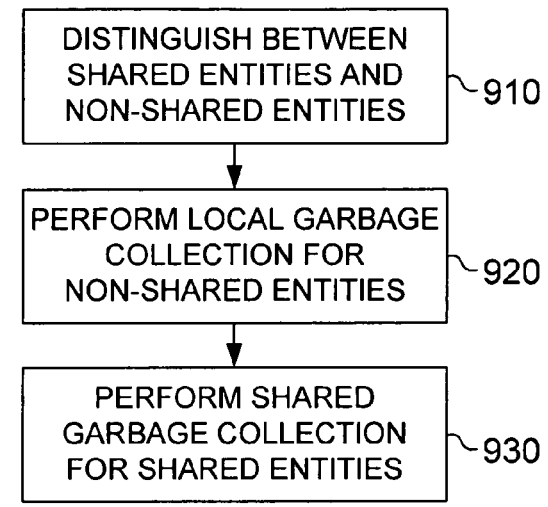
FIG. 3 is a flowchart illustrating a garbage collection scheme for shared and non-shared entities.

FIG. 3 illustrates a flowchart 900 for a garbage collection scheme that can incorporate the garbage collection algorithm described above. The garbage collection scheme distinguishes between shared and non-shared or local entities (910). The memory from non-shared entities is reclaimed using a local garbage collection process performed by each VM. The local garbage collection process does not traverse, move, or reclaim memory from shared entities—in short, the local garbage collection process leaves shared entities alone.

The memory from shared entities is instead reclaimed using a shared garbage collection process. The shared garbage collection process can implement the mark-sweep garbage collection algorithm described above, but it requires coordination and cooperation between the VMs in order to effect that algorithm, as described below. In order to maximize performance and scalability, the shared garbage collection process should be designed to lock access to the shared entities for as short a period as possible and to let the VMs continue to operate independently for as long as possible.

Figure 4:
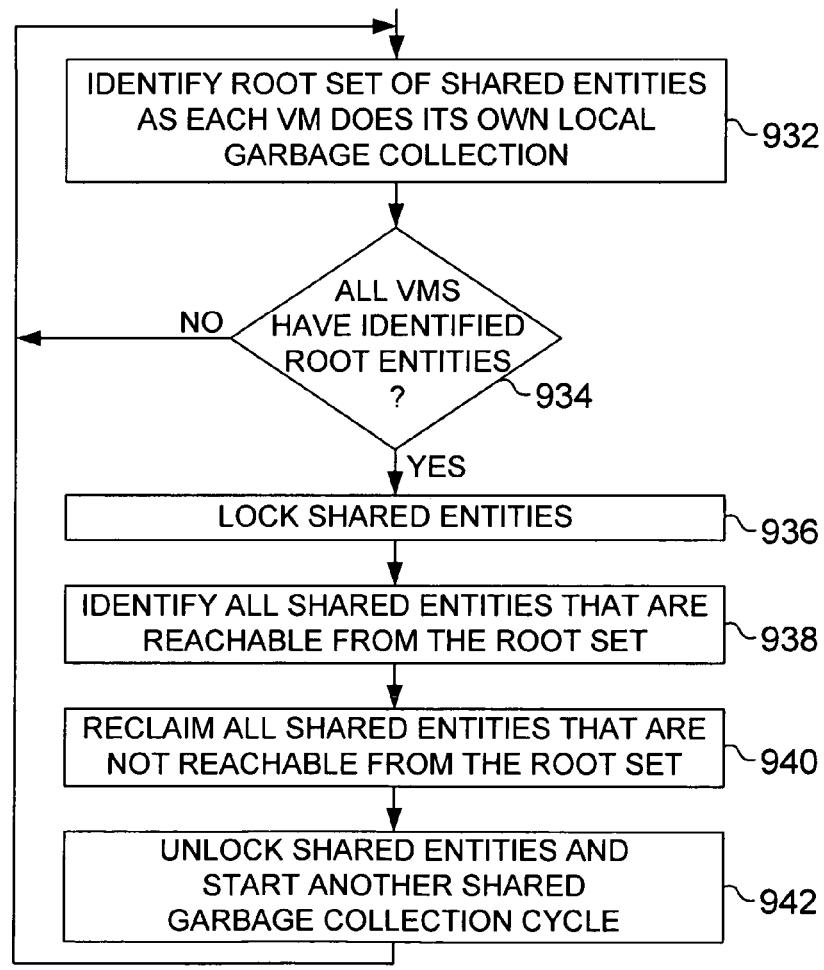
FIG. 4 is a flowchart illustrating a shared garbage collection process.

The flowchart in FIG. 4 illustrates an example process 930 that can be used for shared garbage collection. The VMs first cooperate to identify (932) a root set of shared entities, which is the set of shared entities that are directly referenced by the VMs. The process 930 seeks to maximize the amount of time during which the VMs can continue to run independently; hence, each VM identifies the shared entities that it references (thus effectively adding those entities to the root set) independently of the other VMs.

In one implementation, each VM identifies the shared entities that it references when a local garbage collection cycle occurs in the VM (i.e., when a local garbage collection process is triggered for the garbage collection of local entities). Identifying referenced shared entities as part of a local garbage collection process is efficient, because the local heap of the VM is normally already being traversed as part of the local garbage collection process.

While the VMs independently identify the shared entities that they reference, each VM can continue to access the shared entities and to generate new references to shared entities (e.g., by creating a new shared closure of entities or by mapping an already existing shared closure). Only after all the participating VMs have identified the shared entities that they reference (i.e., after the identification of the root set has been completed, which is represented by the "yes" branch of decision 934) is access to the shared entities restricted (936).

The shared garbage collection process 930 can then proceed to identify all the shared entities that are reachable from the root set of shared entities (938), and reclaim the memory from the shared entities that are not reachable from the root set of shared entities (940). In one implementation, the operation to identify the reachable entities is accomplished by transitively traversing and marking all the shared entities that are referenced by the root set of shared entities, and the operation to reclaim the memory from the shared entities that are not reachable is accomplished by reclaiming the memory from shared entities that have not been marked.

After the memory from the unreachable shared entities has been reclaimed, the VMs can be granted access to the shared entities once again (942), and another shared garbage collection cycle can begin. The start of a new shared garbage collection cycle can include waiting for an appropriate event or trigger to begin the shared garbage collection process 930, and the reinitialization of settings for the shared garbage collection process.

Figure 5:
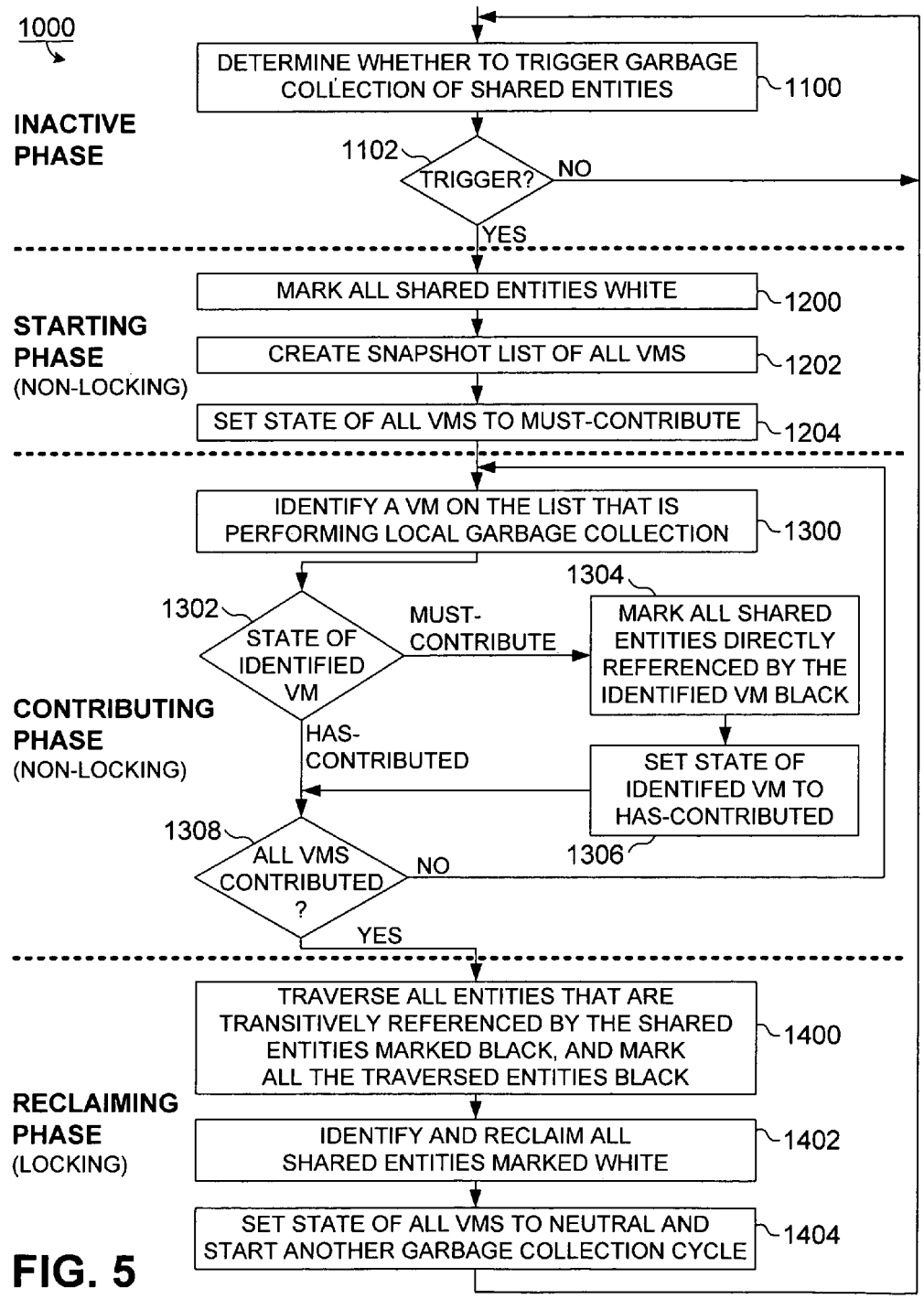
FIG. 5 is a flowchart illustrating a more detailed process for garbage collecting shared entities.
Figure 6:
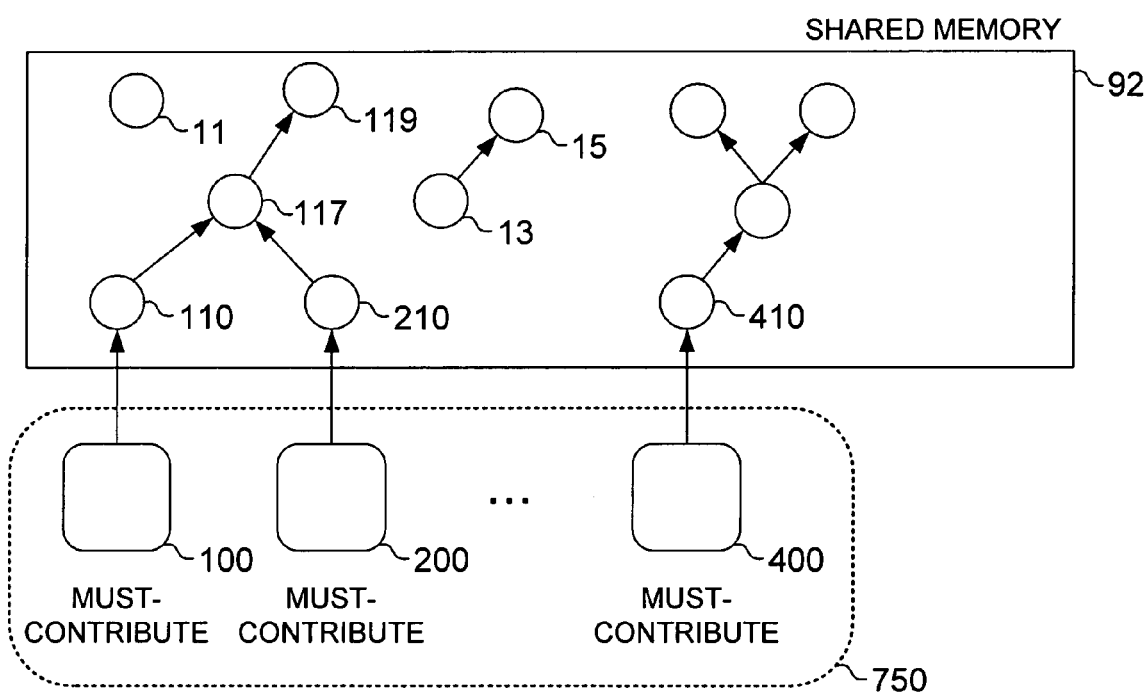
FIGS. 6, 7A-7C, and 8 illustrate the operation of the process depicted in FIG. 5.

FIG. 5 illustrates a more detailed flowchart of a process 1000 that can be used for shared garbage collection. The description of the process 1000 below assumes an example in which there a number of participating VMs, each running possibly different Java programs and using shared closures to share data entities (including, for example, object instances, classes, class loaders, and interned strings). The memory for shared entities is allocated from a shared memory area that can be accessed by the participating VMs. Any conventional heap management functions that allow sufficient reuse of memory can be used to allocate and free shared memory.

The example further assumes that VMs can generate references to shared entities using known sharing techniques. For example, after a shared closure of objects has been created in shared memory, a VM can generate a reference to the shared closure, and thus access the objects in the shared closure, by an operation that maps the shared closure into its address space. References to other types of entities may be generated through other operations. For example, a reference to a shared class can be generated through a "load" operation that specifies the shared class to be loaded, a reference to a shared class loader can be generated by invoking a "create" operation in a shared class loader factory, and a reference to an interned string can be generated through an "intern" operation. The execution of all such operations by a VM results in the creation of a reference from the VM to a shared entity.

The goal of the shared garbage collection process 1000 is to periodically reclaim memory from shared entities that are no longer "live," while minimizing the amount of time that the VMs must be stopped or restricted from accessing the shared entities. The operation of the process 1000 is explained below in conjunction with the example illustrated in FIGS. 6, 7A-7C, and 8.

In general, the process 1000 operates by marking shared entities one of two colors—white or black (this coloring scheme can be implemented, for example, using a bit flag for each shared entity). Per convention in the description of garbage collection techniques, white objects are considered "dead" (i.e., not referenced or reachable), and black objects are considered "live" (i.e., referenced or reachable). Though not shown in FIG. 5, as part of the process 1000, shared entities are colored white when they are first allocated (meaning that the entities are considered "dead" until they are specifically referenced), and black when a VM generates a reference to them. In addition, during the process 1000, each VM is set to one of three states—"neutral," "must-contribute," or "has-contributed." Each VM starts in the "neutral" state when the VM is first created; the other two states are described below.

As shown in FIG. 5, the process 1000 proceeds in multiple phases: an inactive phase, a starting phase, a contributing phase, and a reclaiming phase. These phases are described in turn below.

In the inactive phase, garbage collection for shared entities has not yet started, and the process 1000 simply waits and determines whether to begin shared garbage collection (1100). Shared garbage collection can be triggered (1102) by the detection of a particular event, such as the expiration of a specific period of time, the reaching of a predetermined watermark in shared memory, or the outright exhaustion of shared memory (i.e., the filling of shared memory to capacity).

When it is determined that shared garbage collection should begin, the process 1000 moves into the starting phase. In this phase, the process 1000 first iterates over all shared entities and colors them white (1200). The starting phase is a non-locking phase, meaning that the VMs can continue to operate normally (e.g., they can continue to generate references to and access shared entities). As specified above, the generation of a reference to a shared entity colors the shared entity black; hence, some shared entities may be colored black during this phase. This does not affect the correctness of the shared garbage collection process, though it could make the process less efficient. In essence, shared entities that are marked black during this phase may become false positives—i.e., falsely marked black entities that are no longer referenced by any VM and that should therefore be garbage collected. This potential inefficiency is tolerated, however, so as to avoid having to lock access to the shared entities during this phase. In other words, the process 1000 proceeds conservatively (by allowing the possibility of not reclaiming some entities that could technically be reclaimed) in order to further the goal of minimizing the amount of time during which the VMs are restricted from accessing the shared entities.

After all the shared entities have been colored white, the process 1000 creates a snapshot list of all the existing VMs (1202), and sets the state of all the VMs on the list to "must-contribute" (1204). The result of these operations is illustrated in the example in FIG. 6, where all the shared entities in the shared memory 92 are shown in white, and where the VMs 100, 200, and 400 in the snapshot list of VMs 750 are shown in the "must-contribute" state.

The snapshot list of VMs represents the VMs that are to cooperate in identifying the root set of shared entities to be used by the garbage collection process 1000. The "must-contribute" state of each VM indicates that as of yet, none of the VMs on the list has contributed to the root set—i.e., none of the VMs has thus far identified the shared entities that are directly referenced by the VM.

Unlike the VMs on the snapshot list, VMs that are created after all the shared entities have been colored white do not need to explicitly identify the shared entities that they reference. This is because such shared entities are automatically colored black when a reference to those entities is first generated. (As indicated above, all shared entities are colored black when a VM generates a reference to them.) Accordingly, VMs that are created after all the shared entities have been colored white can be left in the "neutral" state in which they are initialized—they need not be set to the "must-contribute" state, nor added to the snapshot list of VMs.

Depending on the implementation of the process 1000 and the timing of events, it could be the case that a VM that is created after all the shared entities have been colored white, but before the snapshot list of VMs is generated, is included in the snapshot list of VMs and thus set to the "must-contribute" state. As explained above, technically such VMs do not need to explicitly identify the shared entities that they reference—i.e., because the shared entities that they reference will automatically be colored black, it is not necessary to make such VMs iterate over and color those entities black again. This potential inefficiency (unnecessarily adding VMs to the snapshot list and making such VMs explicitly identify shared entities) is tolerated, however, in order to avoid having to lock access to the shared entities. As before, the rationale is that any performance hit stemming from this potential inefficiency will be more than made up for by the performance improvement resulting from minimizing the amount of time during which the VMs are restricted from accessing the shared entities.

The next phase of the process 1000 is the contributing phase. The goal of this phase is to have each VM that is in the "must-contribute" state identify the shared entities that the VM directly references. The contributing phase is also a non-locking phase, meaning that the VMs can continue to operate normally during this phase. At some point, however, each VM that is in the "must-contribute" state must identify the shared entities that the VM directly references. Various events can be used to trigger the VMs into identifying the shared entities that they reference—e.g., the expiration of a specific period of time, the reaching of a predetermined watermark in shared memory, or the exhaustion of shared memory.

In one implementation, the start of a local garbage collection process (i.e., a process for garbage collecting local entities stored in the local heap of a VM) is used as a triggering event. Thus, when a VM that is included in the snapshot list of VMs undergoes a local garbage collection process (1300), the state of the VM is checked (1302). If the VM is in the "must-contribute" state, the shared entities that are directly referenced by the VM are identified and colored black (1304), at which point the VM can be moved to the "has-contributed" state (1306) to indicate that the VM has already identified its directly referenced shared entities. If the VM is already in the "has-contributed" state, then it can complete its local garbage collection process as it normally would. In other words, each VM must only contribute or identify the shared entities that it references once. After a VM has explicitly identified the shared entities that it references, any additional shared entities that the VM references will be colored black by virtue of the fact that the generation of a reference to a shared entity automatically colors the referenced shared entity black.

Identifying referenced shared entities as part of a local garbage collection process in a VM is efficient, because the local heap of the VM is normally already being traversed as part of the local garbage collection process, and thus does not need to be traversed separately. Nevertheless, other events can be used to trigger VMs to identify the shared entities that they reference. For example, VMs may be forced to identify the shared entities that they reference after a predetermined period of time expires—e.g., if the local garbage collection cycle for a VM does not begin within the predetermined period of time, the VM can be stopped and actively forced to identify the shared entities that it references, either independently or in conjunction with a forced local garbage collection cycle.

Figure 7A:
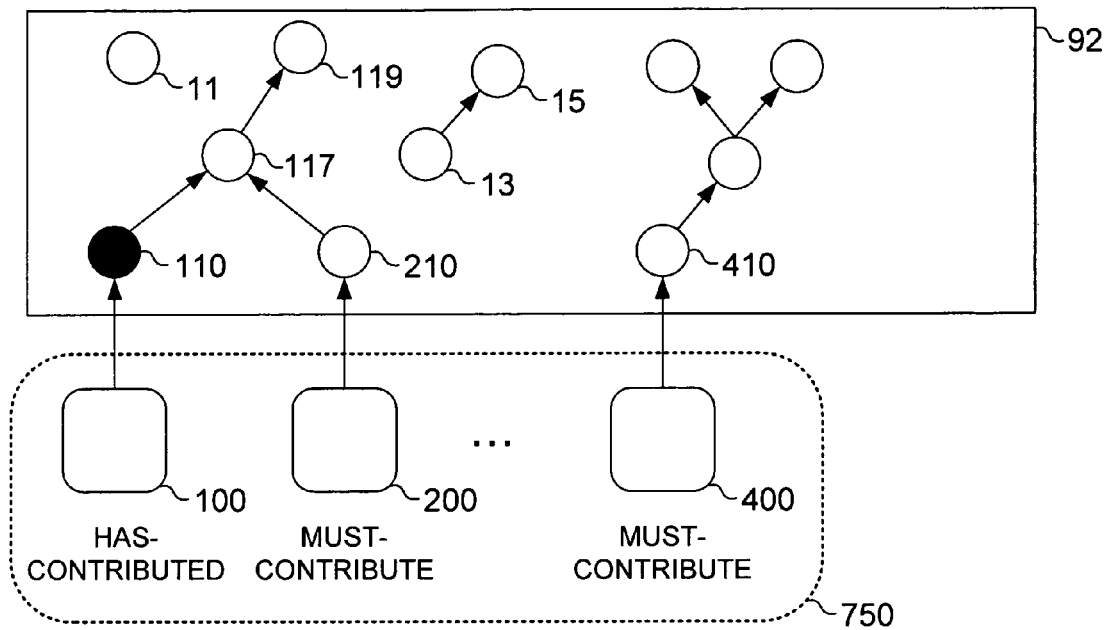
Figure 7B:
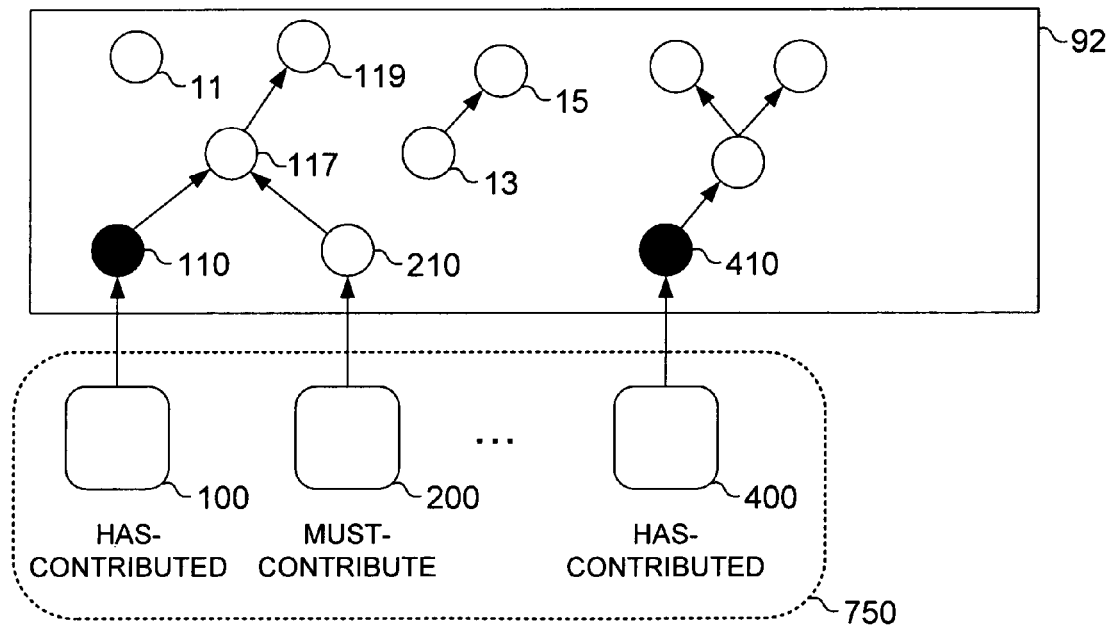
Figure 7C:
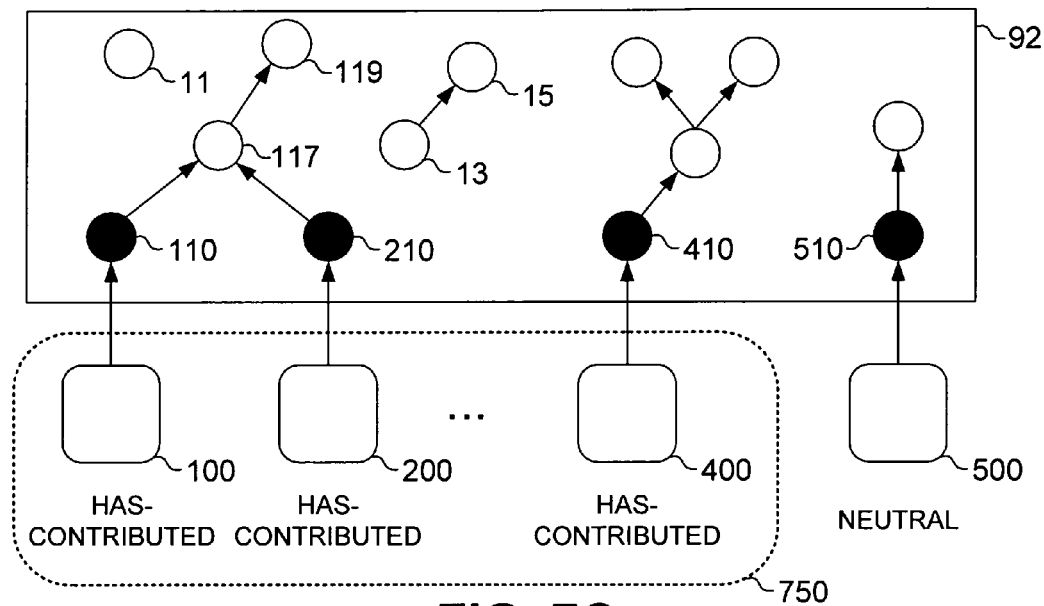

The operation of the contributing phase of the process 1000 is illustrated by the example in FIGS. 7A-7C. In FIG. 7A, the first VM 100 on the snapshot list of VMs 750 has identified the shared entities that it directly references—in this case, the shared entity 110. Accordingly, the shared entity 110 has been colored black, and the VM 100 has been moved to the "has-contributed" state. In FIG. 7B, another VM—the third VM 400—has identified the shared entities that it references (in this example, the shared entity 410, which has accordingly been colored black), and the state of the VM 400 has been set to "has-contributed." Finally, in FIG. 7C, the final VM in the snapshot list of VMs 750—the VM 200—has identified the shared entities that it references (in this example, the shared entity 210, which has accordingly been colored black), and the state of the VM 200 has been set to "has-contributed."

The contributing phase of the process 1000 ends when there are no VMs left in the "must-contribute" state ("yes" branch of decision 1308). When this happens, there can be no direct references from any VMs to shared entities that are colored white:

VMs that are in the "has-contributed" state have already colored all the shared entities that they reference (at the time of their first local garbage collection cycle following the start of the shared garbage collection process) black, and any newly-referenced shared entities are colored black by virtue of the fact that the generation of a reference to a shared entity automatically marks the referenced shared entity black.

VMs that are in the "neutral" state can only have references to black shared entities. This is because such VMs can only have been created after all the shared entities were colored white in the starting phase of the process 1000, which means that all the references generated by such VMs also occurred after the white-coloring operation in the starting phase. Consequently, since the generation of a reference to a shared entity automatically colors the referenced shared entity black, all shared entities referenced by the VMs in the "neutral" state are colored black. This is shown conceptually in FIG. 7C, where a VM 500 in the "neutral" state has generated a reference to a shared entity 510, and the shared entity 510 has accordingly been colored black.

As explained above, at the beginning of the final, reclaiming phase of the process 1000, all the shared entities that are directly referenced by the VMs are colored black. Such shared entities are "live" entities whose memory should not be reclaimed by the shared garbage collection process. However, there may be additional shared entities that are also "live" and that should not be garbage collected—those are the shared entities that are referenced by the shared entities that have already been deemed "live" (i.e., the shared entities that have already been colored black).

For example, in FIG. 7C, the black shared entity 210 references the shared entity 117—hence, the shared entity 117 should also be deemed "live" and thus colored black. Furthermore, the shared entity 117 references the shared entity 119, which means that the shared entity 119 should also be deemed "live" and thus colored black.

In essence, the shared entities that are colored black at the beginning of the reclaiming phase of the process 1000 serve as a root set of entities for shared garbage collection. The shared garbage collection process needs to aggregate liveness information by identifying all the shared entities that are transitively referenced by the root set of shared entities; all remaining shared entities can then be reclaimed.

The process 1000 aggregates liveness information by traversing all the shared entities that are transitively referenced by the shared entities colored black (i.e., the root set of shared entities), and coloring the traversed entities black (1400). Any shared entities that are still colored white at the end of this traversal can be deemed "dead" or not reachable, and their memory can thus be reclaimed (1402).

Figure 8:
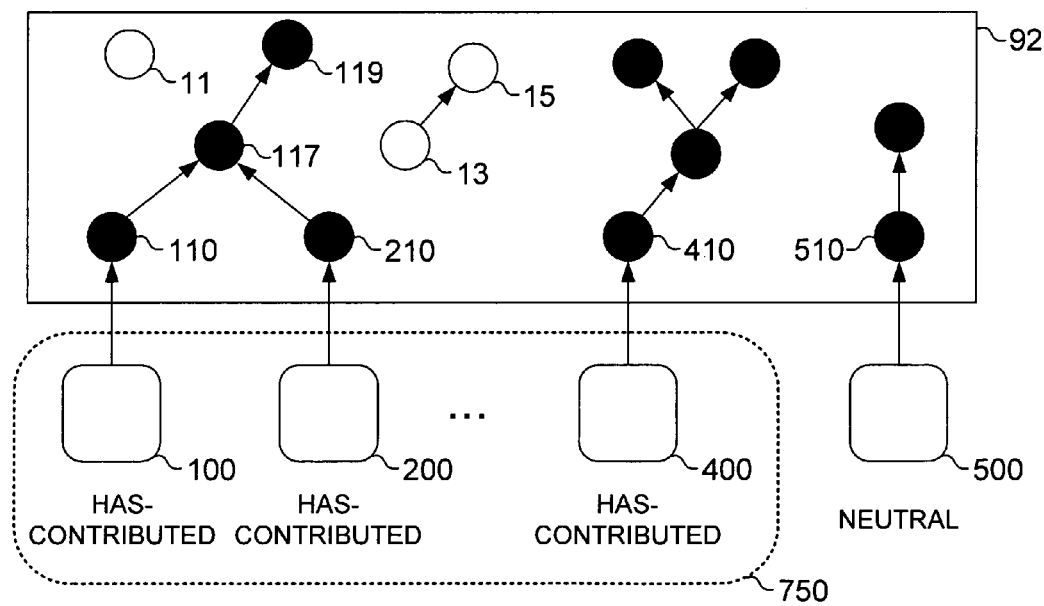

FIG. 8 illustrates the traversal and coloring of shared entities in the reclamation phase. At the beginning of the reclamation phase (which is the end of the contributing phase, illustrated in FIG. 7C), the shared entities 110, 210, 410, and 510 form a root set of black or "live" shared entities. All the shared entities transitively referenced by the shared entities 110, 210, 410, and 510 are traversed and colored black (as exemplified by the black coloring of the shared entities 117 and 119). After the transitively referenced entities have been traversed, only the shared entities 11, 13, and 15 are colored white. Those shared entities are not reachable from any VM, and hence they can be garbage collected.

References from one shared entity to another shared entity can include both explicit and implicit references. The following are some examples of references:

In an implementation where objects are shared through shared closures, each object in a shared closure implicitly references the whole shared closure. This is required so that the whole shared closure has the same state of liveness (the shared closure is created, mapped, and deleted in one atomic unit).

Shared closures implicitly reference the shared classes of which the objects in the shared closure are instances. For example, if an object O in a shared closure is an instance of a shared class C, the shared class C is implicitly referenced by the shared closure.

Shared classes implicitly reference their shared class loader.

Shared class loaders (explicitly or implicitly, depending on the implementation) reference their shared parent class loaders.

Shared class loaders (explicitly or implicitly, depending on the implementation) reference all the shared classes they have loaded.

Shared classes implicitly reference the shared interned strings that are used as string constants by the classes.

A referenced shared entity should generally be traversed and colored black regardless of whether the reference to the shared entity is explicit or implicit.

The reclaiming phase of the process 1000 is a locking phase—VMs cannot generate new references to shared entities during the traversal of the shared entities and the reclamation of the shared entities that are not reachable. However, as exemplified by the process 1000, locking can be minimized to a small portion—e.g., the reclaiming phase illustrated in FIG. 5—of the overall shared garbage collection cycle. Minimizing the portion of the shared garbage collection cycle that requires locking may require a tradeoff in terms of efficiency—for example, the process 1000 may perform some redundant operations, and may not always reclaim all the memory that is technically available to be reclaimed. However, minimizing the portion of the shared garbage collection cycle that requires locking (and hence maximizing the portion of the cycle during which the VMs can continue to operate normally) is likely to increase the overall performance and scalability of a given system.

The end of the reclaiming phase marks the end of a shared garbage collection cycle. Accordingly, the process 1000 can reinitialize all VMs to the "neutral" state (1404), and begin another shared garbage collection cycle by returning to the inactive phase.

Various modifications of the above techniques are possible. For example, modifications can be made to reduce the locking portion of the shared garbage collection cycle even further. In the example process 1000 illustrated in FIG. 5, access to the shared entities is restricted during all three operations 1400, 1402, and 1404 of the reclaiming phase. However, it is possible to allow the VMs to continue to access the shared entities in an unrestricted manner throughout the operation 1400, during which liveness information is aggregated (e.g., by traversing all the shared entities that are transitively referenced from the root set of shared entities). In such an implementation, the VMs can continue to generate new references to shared entities while the operation 1400 is carried out. However, if a VM does generate such a new reference to a shared entity, the VM will need to aggregate the liveness information for the newly referenced shared entity itself (e.g., it will need to traverse the shared entities that are transitively referenced by the newly referenced shared entity and color the traversed entities black). In essence, the generation of a reference to a shared entity during the operation 1400 should result in the directly referenced shared entity, as well as all indirectly (i.e., transitively) referenced shared entities, being colored black.

Thus, although FIG. 5 illustrates the locking portion of the reclaiming phase as constituting the entire reclaiming phase, locking can be reduced to a smaller portion of that phase. A similar modification can be made to the process 930 illustrated in FIG. 4: The operation 936 to lock the shared entities can be performed after the operation 938 to identify all the shared entities that are reachable from the root set, provided that a comparable mechanism is implemented to ensure that all the shared entities that are reachable from any newly referenced entities are identified. Thus, the locking portion of the process 930 can be reduced to the reclamation operation 940.

It should also be noted that "locking" or "restricting access" to shared entities can involve different restrictions, depending on how the entities are shared. In some implementations, runtime systems are provided read-only access to shared entities. For example, in some implementations, runtime systems can map shared entities into their address space, and they can read such entities, but if they want to modify the shared entities, they need to copy the shared entities into their address space and work on the local or non-shared copies. In such implementations, "locking" can be effected as described above (by preventing the generation of new references to shared entities, while allowing other operations, such as reading shared entities that were previously referenced). In other implementations—e.g., in an implementation where runtime systems can write to shared entities—the locking phase can include additional restrictions, such as preventing write access to the shared entities.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. As one example, the process depicted in FIG. 3 does not require the particular order shown, or sequential order, to achieve desirable results (e.g., the local and shared garbage collection operations can be performed at different places within the overall process). In certain implementations, multitasking and parallel processing may be preferable. Other embodiments are within the scope of the following claims.

What is claimed is:

1. A machine-readable storage medium comprising instructions which, when executed, cause a machine to:
   identify a plurality of runtime systems relating to a plurality of shared entities stored in shared memory accessible by the plurality of runtime systems;
   reference the plurality of runtime systems to one or more of the plurality of shared entities via a root set entity associated with the plurality of shared entities, wherein each runtime system of the plurality of runtime systems further references its corresponding unshared local entities that are stored locally at each of the plurality of runtime systems;
   perform a shared garbage collection concurrently at each runtime system of the plurality of runtime systems to identify one or more of the plurality of shared entities not referenced by the plurality of runtime systems, and to reclaim a portion of the shared memory being occupied to store the one or more unreferenced shared entities of the plurality of shared entities by removing the one or more unreferenced shared entities from the shared memory; and
   perform a local garbage collection at each of the plurality of runtime systems simultaneously with performing the shared garbage collection such that the one or more unreferenced shared entities are identified and removed from the shared memory simultaneously with and independent of identifying and removing one or more of the unshared local entities that remain unreferenced by their corresponding runtime systems of the plurality of runtime systems.

2. The machine-readable storage medium of claim 1, wherein the runtime systems comprise virtual machines including one or more of Java virtual machines, Advanced Business Application Programming language (ABAP) virtual machines, and Common Language Runtime (CLR) virtual machines.

3. The machine-readable storage medium of claim 1, wherein the shared entities comprise one or more of object instances, class runtime representations, class loaders, and interned strings.

4. The machine-readable storage medium of claim 1, wherein the shared and local garbage collections are simultaneously initiated upon occurrence of a predetermined event including reaching a predetermined time period or a predetermined shared memory usage level.

5. The machine-readable storage medium of claim 1, wherein the shared garbage collection is initiated after each runtime system of the plurality of runtime systems has independently identified one or more shared entities of the shared entities that it references.

6. A method comprising:
   identifying a plurality of runtime systems relating to a plurality of shared entities stored in shared memory accessible by the runtime systems, the runtime systems residing at a memory of a server computer system including an application server, the memory further having the shared memory;
   referencing the plurality of runtime systems to one or more of the plurality of shared entities via a root set entity associated with the plurality of shared entities, wherein each runtime system of the plurality of runtime systems further references its corresponding unshared local entities that are stored locally at each of the plurality of runtime systems;
   performing a shared garbage collection concurrently at each runtime system of the plurality of runtime systems to identify one or more of the plurality of shared entities not referenced by the plurality of runtime systems, and to reclaim a portion of the shared memory being occupied to store the one or more unreferenced shared entities of the plurality of shared entities by removing the one or more unreferenced shared entities from the shared memory; and
   performing a local garbage collection at each of the group of runtime systems simultaneously with performing the shared garbage collection such that the one or more unreferenced shared entities are identified and removed from the shared memory simultaneously with and independent of identifying and removing one or more of the unshared local entities that remain unreferenced by their corresponding runtime systems of the plurality of runtime systems.

7. The method of claim 6, wherein the runtime systems comprise virtual machines including one or more of Java virtual machines, Advanced Business Application Programming language (ABAP) virtual machines, and Common Language Runtime (CLR) virtual machines.

8. The method of claim 6, wherein the shared entities comprise one or more of object instances, class runtime representations, class loaders, and interned strings.

9. The method of claim 6, wherein the shared and local garbage collections are simultaneously initiated upon occurrence of a predetermined event including reaching a predetermined time period or a predetermined shared memory usage level.

10. The method of claim 6, wherein the shared garbage collection is initiated after each runtime system of the plurality of runtime systems has independently identified one or more shared entities of the shared entities that it references.

11. A system comprising:
   a computer server system including a memory having runtime systems and a shared memory having shared entities, the computer server system further including an application server to
   identify a plurality of runtime systems relating to a plurality of shared entities stored in the shared memory accessible by the runtime systems;
   reference the plurality of runtime systems to one or more of the plurality of shared entities via a first root set entity associated with the plurality of shared entities, wherein each runtime system of the plurality of runtime systems further references its corresponding unshared local entities that are stored locally at each of the plurality of runtime systems;
   perform a shared garbage collection concurrently at each runtime system of the plurality of runtime systems to identify one or more of the plurality of shared entities not referenced by the plurality of runtime systems, and to reclaim a portion of the shared memory being occupied to store the one or more unreferenced shared entities of the plurality of shared entities by removing the one or more unreferenced shared entities from the shared memory; and
   perform a local garbage collection at each of the plurality of runtime systems simultaneously with performing the shared garbage collection such that the one or more unreferenced shared entities are identified and removed from the shared memory simultaneously with and independent of identifying and removing one or more of the unshared local entities that remain unreferenced by their corresponding runtime systems of the plurality of runtime systems.

12. The system of claim 11, wherein the runtime systems comprise virtual machines including one or more of Java virtual machines, Advanced Business Application Programming language (ABAP) virtual machines, and Common Language Runtime (CLR) virtual machines.

13. The system of claim 11, wherein the shared entities comprise one or more of object instances, class runtime representations, class loaders, and interned strings.

14. The system of claim 11, wherein the shared and local garbage collections are simultaneously initiated upon occurrence of a predetermined event including reaching a predetermined time period or a predetermined shared memory usage level.

15. The system of claim 11, wherein the shared garbage collection is initiated after each runtime system of the plurality of runtime systems has independently identified one or more shared entities of the shared entities that it references.

* * * * *